United States Patent
Decker et al.

(10) Patent No.: US 6,198,549 B1
(45) Date of Patent: *Mar. 6, 2001

(54) SYSTEM, METHOD, PROGRAM, AND PRINT PATTERN FOR PERFORMING REGISTRATION CALIBRATION FOR PRINTERS BY MEASURING DENSITY

(75) Inventors: William Chesley Decker, Longmont; Ho Chong Lee, Boulder; Jack Louis Zable, Niwot, all of CO (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/903,587

(22) Filed: Jul. 31, 1997

(51) Int. Cl.⁷ ..................................................... H04N 1/46
(52) U.S. Cl. ............................ 358/504; 358/1.9; 358/501; 347/19
(58) Field of Search ................................. 358/504, 501, 358/540, 1.9, 1.4, 502; 382/294, 287, 162; 347/19, 116, 248, 232; 345/431; 101/181, 170, 211; 399/49, 53–54

(56) References Cited

U.S. PATENT DOCUMENTS

| | | | |
|---|---|---|---|
| 4,428,287 | 1/1984 | Greiner | 101/170 |
| 4,546,700 | * 10/1985 | Kishner et al. | 101/211 |
| 4,752,892 | 6/1988 | Lecha | 358/1.4 |
| 5,076,163 | 12/1991 | Sainio | 101/181 |
| 5,241,400 | * 8/1993 | Itagaki | 358/401 |
| 5,313,570 | * 5/1994 | Dermer et al. | 345/431 |
| 5,473,734 | 12/1995 | Maskell et al. | 358/1.9 |
| 5,481,379 | 1/1996 | Yosefi | 358/501 |
| 5,555,107 | 9/1996 | Funada et al. | 358/518 |
| 5,576,753 | * 11/1996 | Kataoka et al. | 347/248 |
| 5,627,649 | * 5/1997 | Sawayama et al. | 358/296 |
| 5,838,465 | * 11/1998 | Satou et al. | 358/520 |
| 5,854,958 | * 12/1998 | Tanimoto et al. | 399/49 |
| 6,076,915 | * 6/2000 | Gast et al. | 347/19 |

FOREIGN PATENT DOCUMENTS

| | | |
|---|---|---|
| 7-306764 | 11/1995 | (JP). |
| 8-72274 | 3/1996 | (JP). |

* cited by examiner

Primary Examiner—Leo H. Boudreau
Assistant Examiner—Ishrat Sherali
(74) Attorney, Agent, or Firm—Mariyln Smith Dawkins; David W. Victor; Konrad Raynes & Victor

(57) ABSTRACT

The system, method, program, and print pattern of this invention allows print misregistration to be detected and controlled through density measurements. A special print pattern is used for which a correlation between a density measurement of the print pattern and an amount of misregistration can be made. Initially, for a given printer, and for each printing station within the printer, the special print pattern is printed using two printing stations at varying amounts of misregistration of one of the printing stations. The density of each special print pattern printed at the varied amount of misregistration is measured. A correlation is made between density and amount of misregistration of the one printing station relative to the other printing station. Whenever misregistration is desired to be determined, the special print pattern is printed, the density is measured, and the correlation is applied to the measured density to determine a misregistration amount.

30 Claims, 7 Drawing Sheets

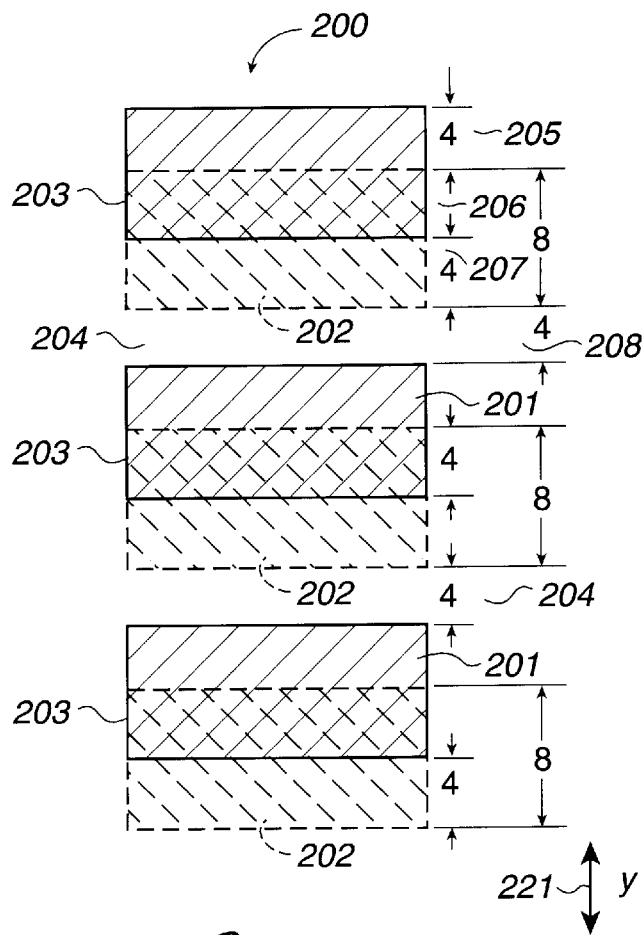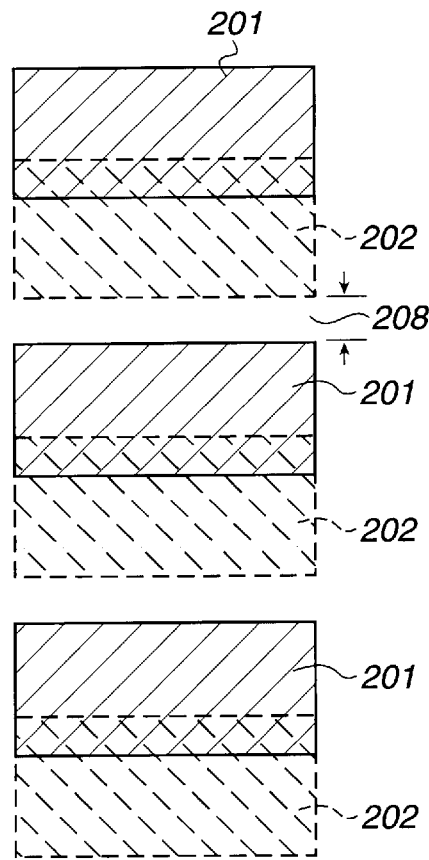
Fig. 2A　　Fig. 2B
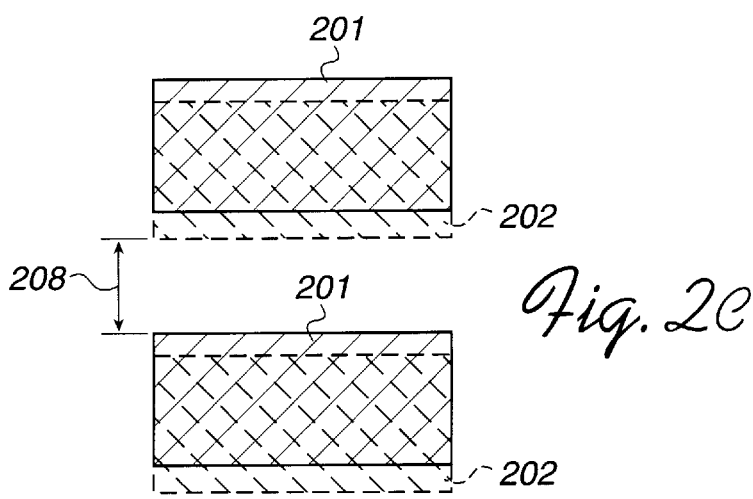
Fig. 2C

SYSTEM, METHOD, PROGRAM, AND PRINT PATTERN FOR PERFORMING REGISTRATION CALIBRATION FOR PRINTERS BY MEASURING DENSITY

BACKGROUND OF THE INVENTION

1. Field of the Invention

This invention relates to the field of determining printing misregistration for printers, and more specifically, determining misregistration for each printing station in a printer having multiple printing stations.

2. Description of the Related Art

In order to ensure the best possible print quality from a printer, an operator typically will recalibrate the printer each day. Two of the most important factors that should be calibrated are density and registration. To calibrate the density, the operator will print out a control strip of the different colors (toners) used by the printer. The operator will then use a densitometer to measure the density of each of the patches in the control strip. Then, as a result of the density measurement reading of each of these patches, the operator will make some manual adjustments to the printer to correct for density in the different density ranges. Since maintaining optical density is a very important parameter that the operator needs to control for a printer, most operators have a densitometer for measuring the density.

Also, in a printing process, it is very important that all of the colors are correctly registered since colors are overlaid on top of each other to achieve a desired color as required in the subtractive printing process. If the colors are out of registration, a combination of colors will not lie directly on top of each other, and the quality of the color printing is distorted. In summary, maintaining accurate registration is required to get good color fidelity.

In order to calibrate the printer for registration, the printer will also print out a pattern of very small intersecting lines as shown in FIG. 1. The patterns are used for the registration of each color of the printer, e.g., cyan, magenta, and yellow, relative to black. The patterns are printed in both the X-direction and the Y-direction to calibrate the registration in both of these directions. For a printer having three colors, e.g., cyan, magenta, and yellow, six targets will be printed: three horizontal and three vertical. A greatly magnified illustration of these targets is shown in FIG. 1.

Typically, one can only determine the point of intersection with the aid of an eye loop or by using expensive and sophisticated imaging equipment. Ideally, the line should intersect at 0. If the line intersects at +1, the operator has to adjust the registration of the printer to make a correction for +1. Using an eye loop involves a "manual" process of eyeballing whether registration is off by examining the targets of colors that are laid on top of one another. With the aid of an eye loop, it may be difficult to readily determine whether the registration is +1, +2, 0, −1, or −2. Typically, experienced operators can only achieve a registration accuracy within +1 or −1 pel. Basically, these patterns are very difficult to read. For example, typically all of the patterns together, shown in FIG. 1, would take up an area of only about 0.5×0.25 inches.

As a typical scenario, an operator will, on a daily basis, use a densitometer to measure printed patches for adjusting the optical density of the printer, and will use an eye loop to measure another group of patterns for adjusting the registration. The patterns, i.e., targets, are typical of what are used in the industry to measure registration and the eyeball is the measuring device. Consequently, this registration process is totally nonautomated.

Although there are a variety of ways for determining misregistration, most of the currently known techniques are similar in that they all compare a line or dot to a reference line, as just described. Then, corrections are made based upon a difference in location with respect to an ideal value or reference distance. The measurement of this variation from the reference distance can be done in an automated manner via sophisticated and expensive image analyzer equipment, or done in a nonautomated manner via the use of a microscope or the equivalent. It may not be cost justified to use expensive image analyzer equipment for determining misregistrations in a relatively low-cost printer. On the other hand, the inaccuracies and lack of ease of use of the manual determinations may not be sufficient, either.

SUMMARY OF THE INVENTION

It is, therefore, an object of this invention to maintain registration for optimizing color fidelity and crispness of a printed image including when an image is made by printing overlapping colors from multiple printing stations.

It is a further object of this invention to determine misregistration without relying on an "eyeball" measurement, and without using expensive and sophisticated equipment.

The system, method, program, and print pattern of this invention allow print misregistration to be detected and controlled by measuring density values using an optical densitometer. In one embodiment, the output of the densitometer is tied into the printer control panel and logic. In other embodiments, the densitometer can be used manually by an operator, in which case the operator will input the density results into the printer for automatic registration adjustment, or the operator will determine the resulting misregistration and make the adjustments manually on the printer. Special print patterns are used that have an output density that can be direly related to the amount of misregistration.

The special overall composite print pattern consists of a first repeating pattern of a printed horizontal bar having a specified width (e.g., 8 pels in the preferred embodiment) followed by a white space having, preferably, but not necessarily, the same specified width. The bars are printed by a first printing station, e.g., for the color black. Superimposed on this repeating pattern printed by the first printing station, but offset in a downward direction by half the width of the bars, is another repeating pattern, printed by another print station, e.g., for the color magenta, of a printed bar followed by a white space, all of which, preferably, but not necessarily, have the same specified width. The second repeating pattern is similar to the first repeating pattern described above except that the superimposed pattern is offset in the opposite direction than the offset direction in the first repeating pattern. This describes the overall composite print pattern for a nominal setup.

The above-described overall composite print pattern is used to determine misregistration in the vertical direction. To determine misregistration in the horizontal direction, a similar overall composite print pattern is printed except that the bars are vertical and the superimposed offsets are in the horizontal direction. A set of these overall composite print patterns, for determining both horizontal and vertical misregistration, are printed using each printing station to determine the misregistration of each printing station.

Initially, for a given printer, and for each printing station therein, the above-described overall composite print pattern, having a first and second repeating pattern, is printed at varying incremental amounts of misregistration, including zero pel misregistration as determined by previously known methods. The optical densities of the first and second repeating pattern are measured using a densitometer. The optical density of the second repeating pattern is then subtracted from the optical density of the first repeating pattern to obtain a density difference for each incremental amount of misregistration. A correlation between density difference and amount of misregistration is then determined for the given printer and, if necessary, for each printing station therein, for each horizontal and vertical direction.

Once the correlation is determined, the misregistration at any given time can be determined for each direction and for each color by 1) printing an overall composite print pattern; 2) measuring the optical densities of the first repeating pattern and the second repeating pattern with a densitometer; 3) subtracting the measured optical density of the second repeating pattern from the first repeating pattern to get a density difference; 4) using the above determined correlation to determine a misregistration amount, i.e., a change in registration needed to correct the misregistration; 5) if the misregistration from step 4 is not acceptable, continuing to step 6, otherwise stopping, and 6) making the registration correction according to the misregistration amount and returning to step 1.

BRIEF DESCRIPTION OF THE DRAWING

For a more complete understanding of this invention, reference is now made to the following detailed description of the embodiments as illustrated in the accompanying drawing, wherein:

FIG. 2A illustrates a first repeating pattern, having a repeating color bar and white space superimposed, with an offset in the upward direction, on top of a repeating black bar and white space, all of specified widths, of the overall composite pattern for measuring misregistration in the vertical direction;

FIG. 2B illustrates a misregistration by 2 pels in the upward direction of the first repeating pattern;

FIG. 2C illustrates a misregistration by 2 pels in the downward direction of the first repeating pattern;

DETAILED DESCRIPTION OF THE PREFERRED EMBODIMENTS

Figure 1:
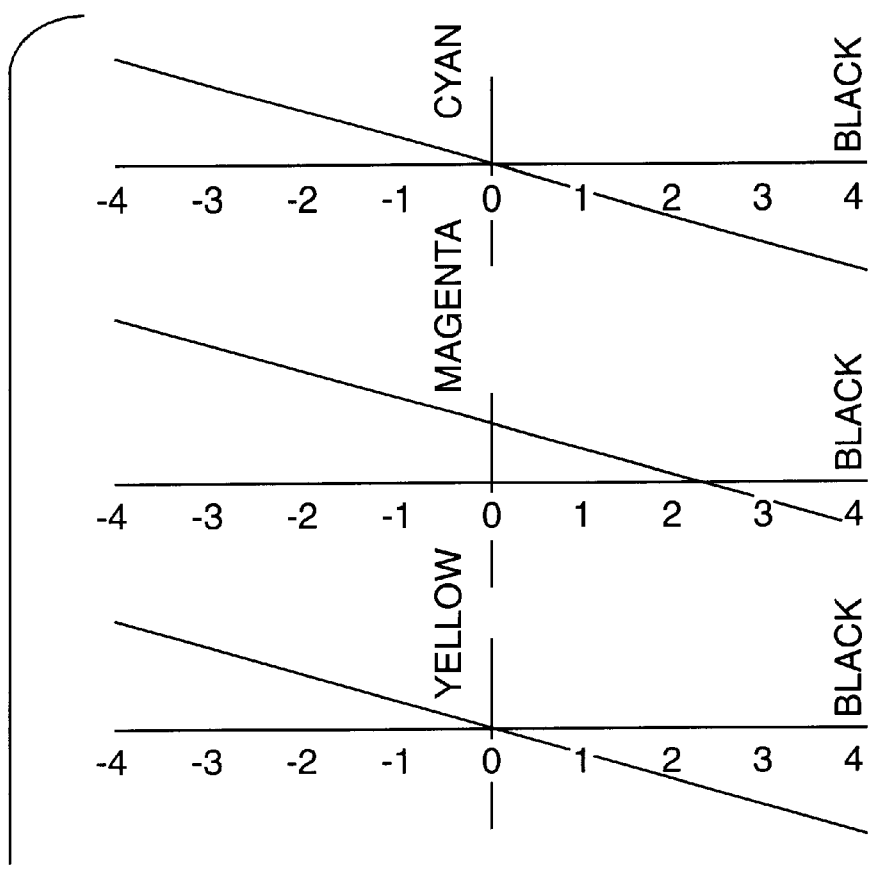
FIG. 1 illustrates registration targets used in previously known methods.
Figure 1:
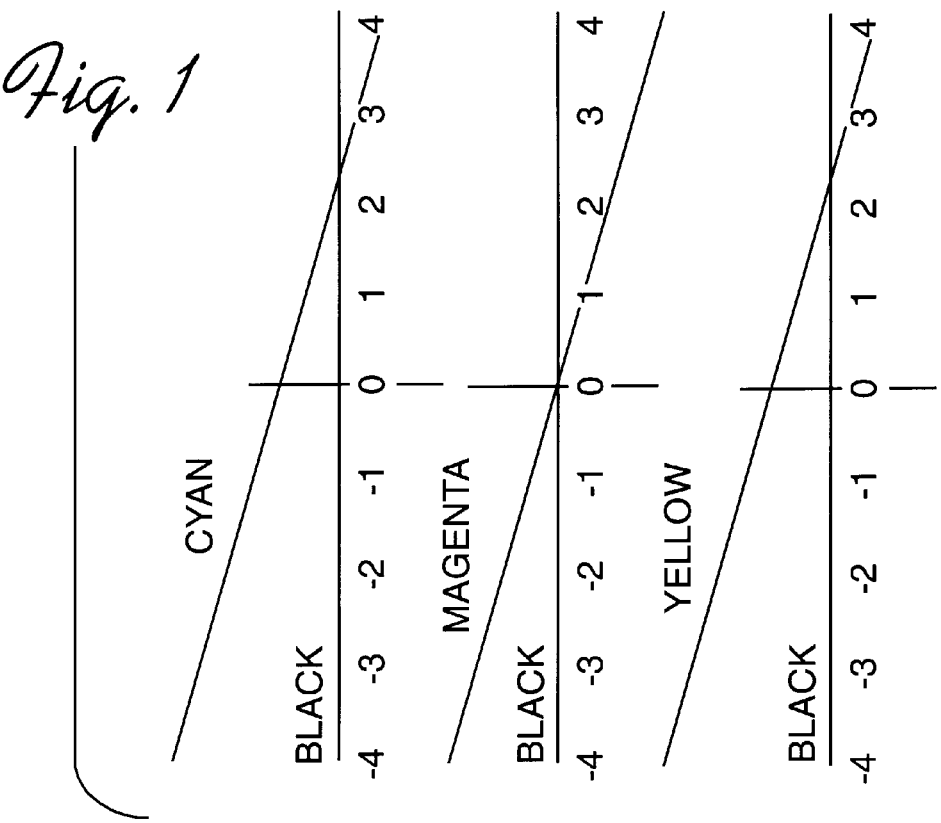

The preferred embodiment of the invention is used in conjunction with an IBM 3170 high-speed color printer. However, the invention can be used in connection with any printer.

The preferred embodiment of the invention carries out the registration process by using a device that measures density, e.g., a densitometer. Such a device, typically, will be available to an operator performing the registration process since the same operator, typically, will be calibrating the density, also, for which a densitometer is required.

Merely by using a densitometer to click on a pattern, as defined by this invention, the density reading will convey to the operator the amount of misregistration.

The basic pattern 200 is shown in FIG. 2A. It should be noted that although this is the pattern used in this preferred embodiment, other patterns could be used. First, a reference color, e.g., black, bar 202, having a specified dimension, is printed. Then another bar 203, having a specified dimension, of a color, for which registration is being measured, is superimposed on top of the black bar, but it is displaced by a certain amount. In the preferred embodiment, each one of these bars is eight pels in the Y-direction 221. A pel is essentially a dot of toner/ink. In a 600 pels/inch printer, the approxmate distance between adjacent pels is 0.00167 inches. A printed dot is larger than a pel by about 30% to 40% so that the printed dots will overlap. Therefore, an 8-pel width will be slightly wider than (8 * 0.00167) or 0.01336 inches. The superimposition 203 is a 4-pel overlap. A 4-pel white space 204 is left after printing another 8-pel black bar 202 which is also superimposed by an 8-pel color bar 201, offset by four pels. The black bar and white space pattern with the superimposed, but offset, color bar and white space pattern is repeated.

The black pattern 202 is eight pels on, eight pels off, and eight pels on. The color, e.g., cyan, pattern 201 is eight pels on, eight pels off, and eight pels on, but it is displaced from the black pattern by four pels. As such, there will be four pels 207 of just black 202, four pels 206 of black with a color superimposed on top of it, four pels 205 of just the color, and four pels 208 of white space. This pattern, as shown in FIG. 2A, represents a nominal condition if each color, including black, is perfectly registered in the Y-direction 221.

FIG. 2B illustrates what happens if the color, e.g., cyan, is misregistered in the upward Y-direction by two pels. The cyan bar relative to the black bar is now moved up by two pels in each repetitive portion of the pattern. The white space 208 is no longer four pels, it is now only two pels. Therefore, the overall optical density of this pattern is going to increase because there is less white space.

FIG. 2C illustrates another case where the color is misregistered downward in the Y-direction by two pels from the nominal. In this case, a greater white space 208 is exposed. Because of this, the optical density will be lower for the misregistration pattern of FIG. 2C than for the nominal registration pattern of FIG. 2A.

Figure 2D:
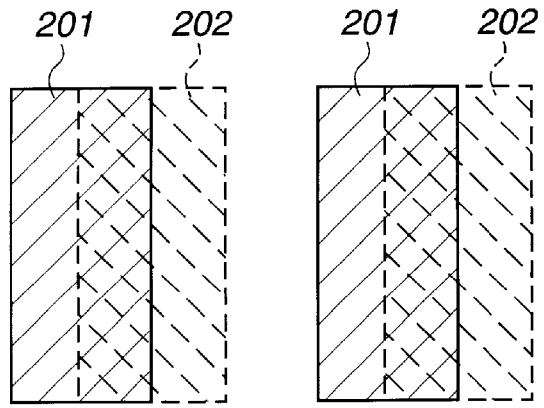
FIG. 2D illustrates a first repeating pattern, having a repeating color bar and white space superimposed, with an offset in the leftward direction, on top of a repeating black bar and white space, all of specified widths, of the overall composite pattern for measuring misregistration in the horizontal direction.

A similar pattern, as shown in FIG. 2D, is used to determine misregistration in the X-direction 222.

Figure 2E:
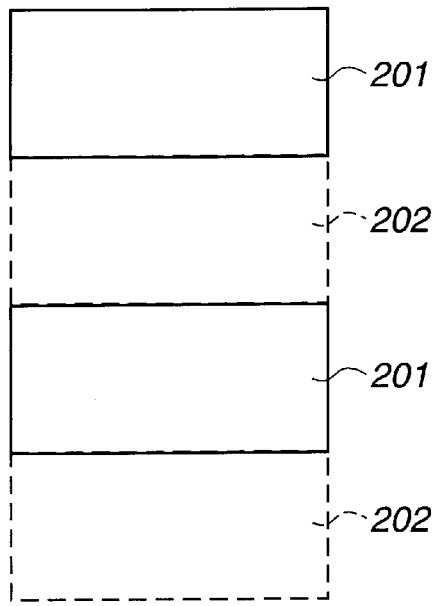
FIG. 2E illustrates a misregistration by 4 pels in the upward direction of the first repeating pattern.
Figure 2F:
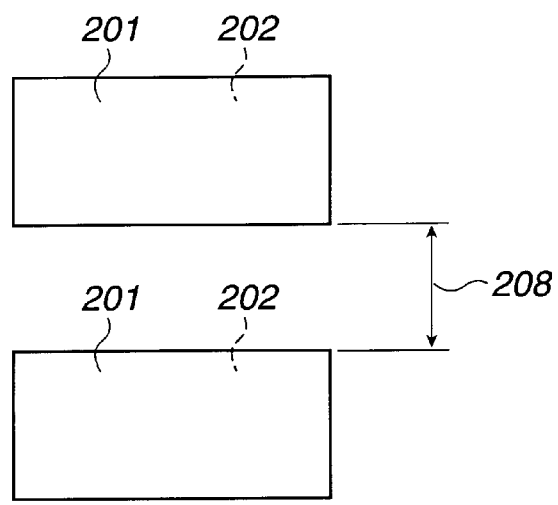
FIG. 2F illustrates a misregistration by 4 pels in the downward direction of the first repeating pattern.

If the color is misregistered upward by +4 pels, as shown in FIG. 2E, the color bar will totally cover the white space of the nominal pattern shown in FIG. 2A. A +4 pel misregistration will basically result in the darkest pattern, i.e., the highest optical density. On the other hand, if the color was misregistered downward by 4 pels, as shown in FIG. 2F, the color bar would completely overlap the black bar, leaving the largest white space 208. This would give the lowest optical density.

Figure 3:
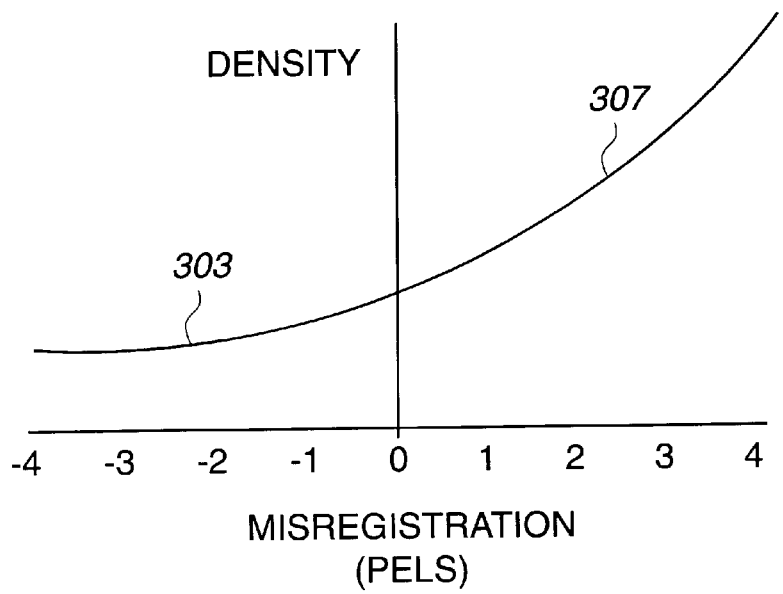
FIG. 3 illustrates a characteristic curve of density versus misregistration of the first repeating pattern of the overall composite pattern.

The characteristic curve of density versus misregistration for this type of pattern is shown in FIG. 3.

Although any size pattern could be used in an embodiment of this invention, the 8-pel pattern described above was chosen for the preferred embodiment for the reasons described below. As the printer is printing out the repetitive test pattern, there will be some variation in registration as the paper is moving through the print station. Therefore, the density readings may not be truly indicative of the average misregistration. If the dimensions of the bars are too fine, e.g., two pels, the misregistration readings may only be applicable for that point in time and will not be an accurate assessment of the average overall misregistration. On the other hand, if the dimensions of the bars are large, e.g., sixteen pels, the aperture of the densitometer may not be large enough to get an accurate reading. That is, if the aperture of the densitometer had a diameter equivalent to the size of 16 pels, the readings from the densitometer would vary greatly depending upon where the densitometer was placed in the repetitive pattern, i.e., mostly over the white space, or an overlapped area, etc. Therefore, the bars in the repetitive pattern, and the amount of initial desired offset of the color bar from the black bar, should be of such a dimension to avoid any inaccuracies due to the placement of the aperture of the densitometer within the repetitive pattern, and to avoid inaccuracies due to density variations caused by variations in the paper velocity through the print station. Also, the minimum distance the pattern should be repeated should be such that there are enough repeated pattern sequences to completely fill the aperture of a densitometer that is being used to measure its density. Likewise, the length of the bars should be longer than the corresponding dimension of the aperture of the densitometer being used.

Figure 4:
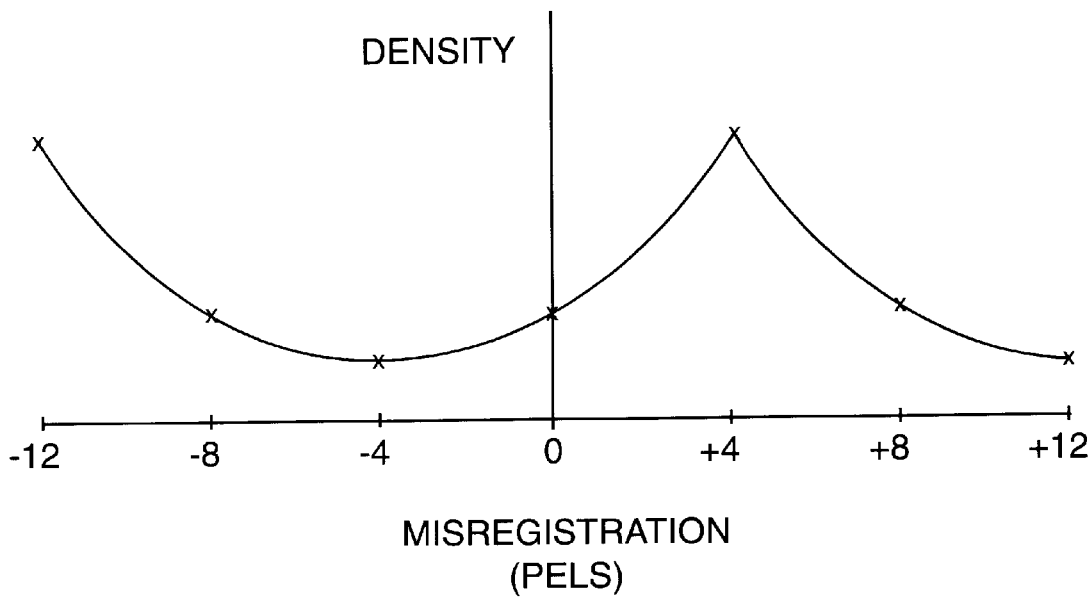
FIG. 4 illustrates the characteristic curve of FIG. 3, including when misregistration is beyond +4 or −4 pels.

Also, the width of the bars also determines how far off registration can detect. For example, if the color bar 201 was off registration by +8 pels from the nominal pattern of FIG. 2A, the resulting repeating pattern would appear the same as that shown in FIG. 2A. In other words, the characteristic curve of FIG. 3 becomes that as shown in FIG. 4 when misregistrations of greater than +4 pels or −4 pels are taken into account. This characteristic curve will also continue to repeat with greater amounts of misregistration, as initially shown in FIG. 4.

As shown in the curve, the amount of misregistration can only be uniquely determined if the misregistration is limited to being within +4 pels or −4 pels. For a misregistration greater than 4 pels in either direction, a given density reading will not uniquely determine the amount of misregistration. As such, a smaller bar dimension will result in a smaller amount of misregistration that can be uniquely determined with a given density reading. For example, a 4-pel bar would have a curve similar to that shown in FIG. 4, except that the limits of misregistration would occur between −2 pels and +2 pels instead of −4 pels and +4 pels as shown for the 8-pel bar. Therefore, the larger the width dimension of the bar, the broader the width is of misregistration that can be detected uniquely.

As such, there are two factors that should be considered in determining the width of the bars used in the repeating pattern. First, the aperture of the densitometer limits how great the width can be, and the amount of misregistration that can be accurately or uniquely determined limits how small the width of the bar can be.

Taking into consideration that misregistrations typically occur within +4 pels or −4 pels for typical daily variations for the specific printer being used herein, and taking into consideration the aperture size of the densitometer being used, the width of each of the bars for the repetitive pattern was chosen to be 8 pels for this preferred embodiment.

There are several ways to determine what the density should be if there is perfect registration (a misregistration of 0 pels). First, one could initially take data by repeating the nominal case when the printer's registration and density is calibrated by using a previously known technique. The average density of all of these nominal test cases should give a close enough measurement of the density with 0 pel misregistration.

Another technique, and the one used in the preferred embodiment, is to print out two repeating patterns, with the color bar offset in the opposite direction for each repeating pattern. The density measurements of the patterns are then subtracted from each other. This is further described in more detail below.

The first basic composite pattern has been shown and described with reference to FIGS. 2A, 2B, 2C, 2E, and 2F. FIG. 3 shows the density variation from measuring the registration output with a densitometer using the basic pattern of these figures.

Figure 5:
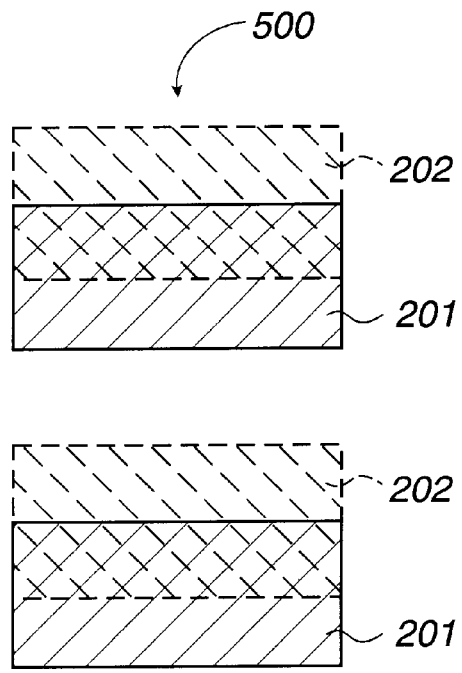
FIG. 5 illustrates a second repeating pattern, having a repeating color bar and white space superimposed, with an offset in the downward direction, on top of a repeating black bar and white space, all of specified widths, of the overall composite pattern for measuring misregistration in the vertical direction.

The second repeating pattern is shown in FIG. 5. Instead of offsetting the color bar upward from the black bar, as in the first pattern, the color bar is offset downward from the black bar. Again, it is an 8-pel pattern.

Figure 6:
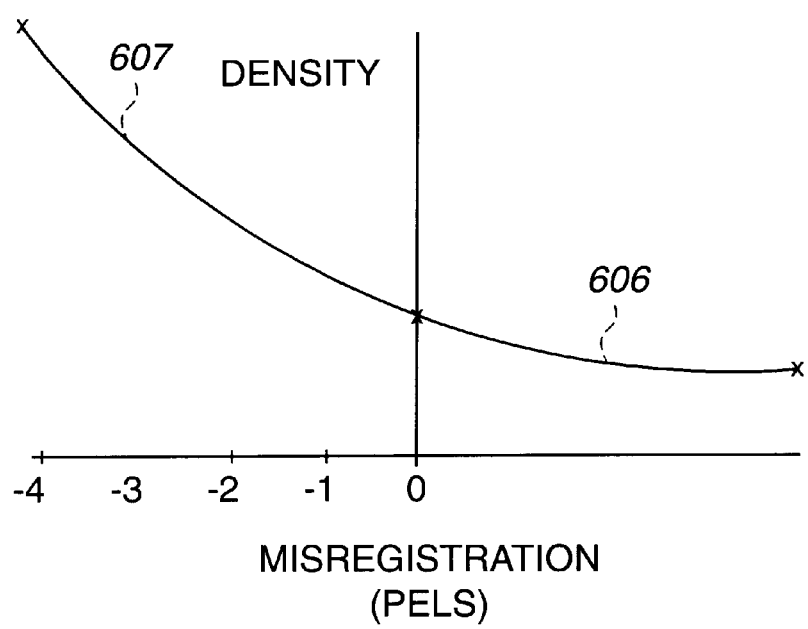
FIG. 6 illustrates a characteristic curve of density versus misregistration of the second repeating pattern of the overall composite pattern.

Using this second repeating pattern 500, if the color bar is misregistered in the upward direction, more white space is exposed and the density will be lower than the density for the nominal case. This is just the opposite of what will happen if the first pattern 200, FIG. 2A, is used. The characteristic curve of density versus misregistration for this second repeating pattern 500 is shown in FIG. 6, which is the mirror image of the curve shown in FIG. 3.

Figure 7A:
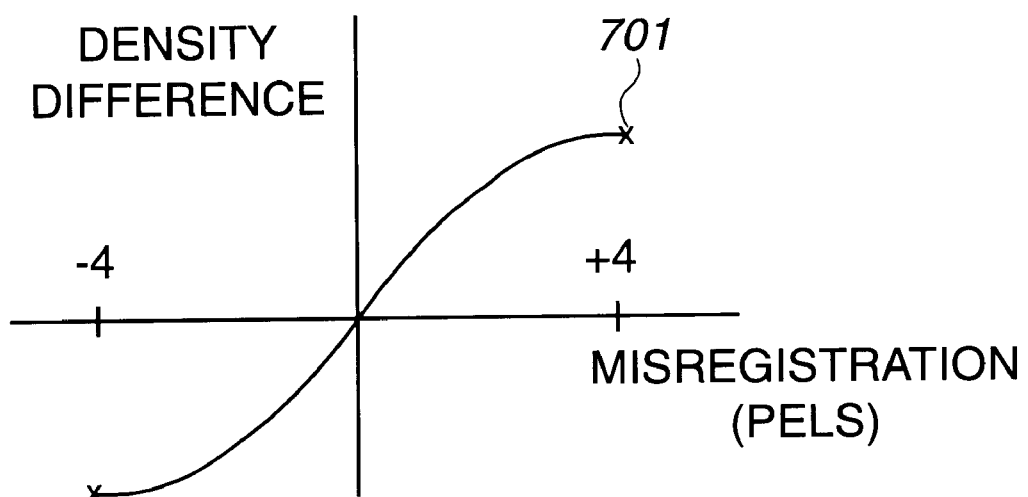
FIG. 7A illustrates a characteristic curve of the density difference when the density of the second repeating pattern is subtracted from the density of the first repeating pattern.
Figure 7B:
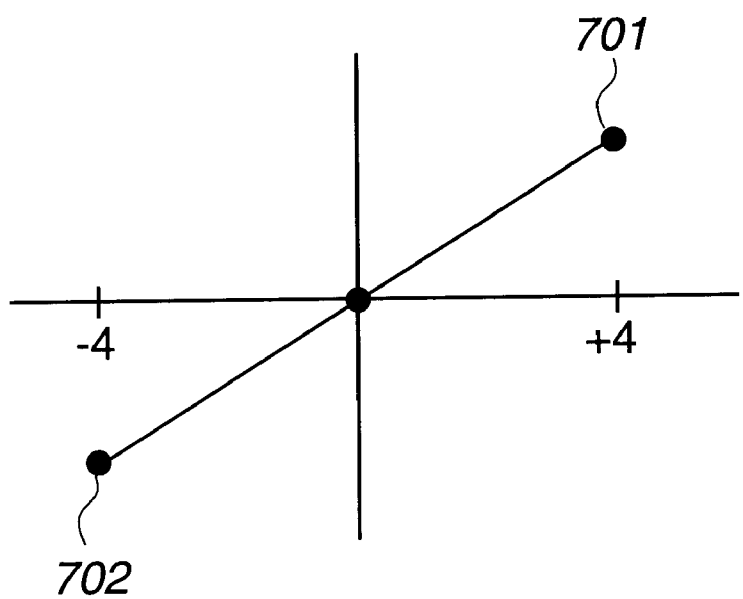
FIG. 7B illustrates a linearization of the characteristic curve shown in FIG. 7A.

If the optical densities that are measured by using the second pattern are subtracted from the optical densities that are measured using the first pattern, the resulting characteristic curve becomes a slight "S" curve representing density difference versus misregistration, as shown in FIG. 7A. For convenience, and with insignificant resulting error, this curve can be estimated to be a linear line as shown in FIG. 7B. It should be noted that the curves and graphs illustrated herein are merely representative of the type of results that can be expected from the data. Actual curves and graphs can be easily achieved by plotting the actual measurements taken for a given printer and toner, etc.

From the curves of FIG. 7A or FIG. 7B, one can determine a misregistration of 0 pels, i.e., nominal, because the two patterns will have a density difference of 0. At nominal, there will be the exact same amount of white space, and the exact same overlap of bars (except in opposite directions), so the optical densities should exactly subtract from each other.

Likewise, at a misregistration of +4 pels for the first pattern, the density may be measured to be of 1.4, but for the second pattern, the density may be measured to be 0.4. The difference of 1 is shown as point 701 for the curves of FIG. 7A and FIG. 7B. At a misregistration of −4 pels for the first pattern, the density may be measured to be 0.4, i.e., it should be the same density as that measured for the second pattern having a misregistration of +4 pels. Again, for the second pattern, for a misregistration of 4 pels, the density should be measured to be the same as that measured for the first pattern having a misregistration of +4 pels, e.g., having a value of 1.4. The difference of −1 is shown as point 702 for the curves of FIG. 7A and FIG. 7B.

Figure 7C:
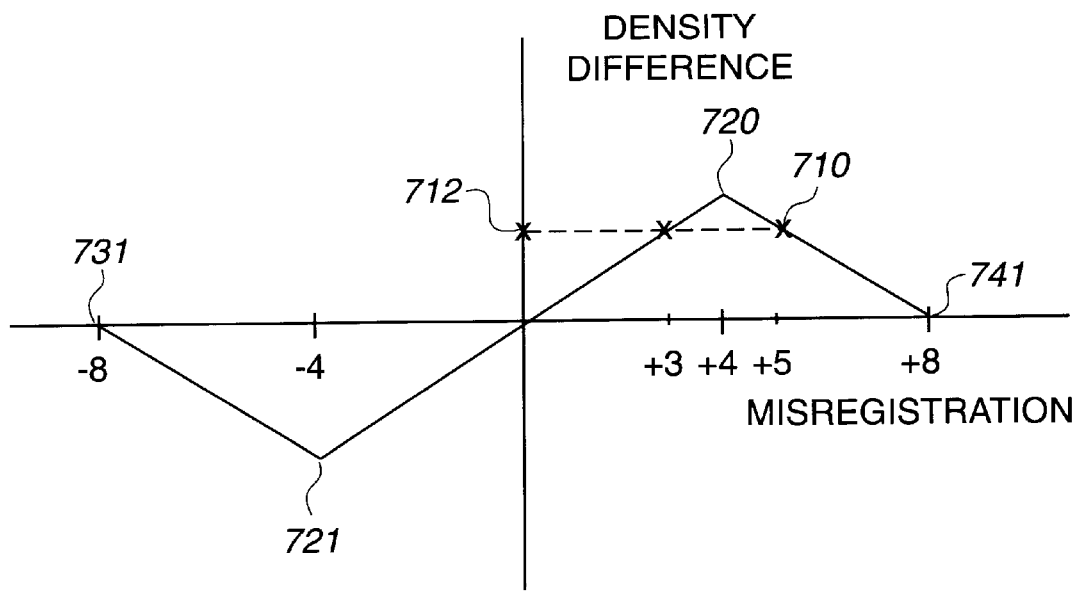
FIG. 7C illustrates a linear curve of the density difference between the first repeating pattern and the second repeating pattern of the overall composite pattern for various amounts of misregistration.

Therefore, the density difference is the result of subtracting the density of one pattern from the density of the other pattern, and it is related to misregistration as shown by the characteristic curves represented by FIG. 7A or FIG. 7B. FIG. 7B (or FIG. 7A) illustrates the basic relationship between density difference and misregistration. FIG. 7C shows an extension of the curve of FIG. 7B beyond +4 pels and −4 pels of misregistration. The curve is symmetric and it will continue to repeat itself as misregistration gets farther out.

The overall accuracy is improved by using both patterns to find a density difference versus misregistration. This is because any one pattern, the first pattern or the second pattern, has a relatively flat portion of its characteristic curve as shown by region 606 in FIG. 6 and region 303 in FIG. 3. By using the density difference, the extent of the flat portion of the curve is reduced, as shown by the curve of FIG. 7A, and is eliminated, as shown by the estimated linear curve of FIG. 7B. Finding the density difference by using both characteristic curves of FIG. 3 and FIG. 6 allows the "deep" portions of the curve, 307, 607, respectively, to have an affect throughout the whole misregistration range. Of course, greater accuracy and sensitivity can be achieved from a given density reading when the curves are more steep than flat. By using the density difference from both patterns, one can achieve acceptable sensitivity throughout the whole range.

For the particular printer used in conjunction with the preferred embodiment of this invention, the printer specification suggests that the registration be maintained within +2 or −2 pels. Basically, the operator can do that, even using the previously known techniques for maintaining registration. It is estimated that by using this invention, an operator can adjust the registration to within a half of a pel or a quarter of a pel of nominal. This assumes, of course, that the printer has the appropriate sensitivity in its controls to allow this fine amount of adjustment.

It should be noted that changes to this preferred embodiment could be made to achieve various amounts of registration accuracy, e.g., even within a tenth of a pel, as required for any given printer by varying the width of the pattern used and/or the size of the aperture of the densitometer.

As mentioned above, the registration is dynamic because the velocity of the paper moving through a printing station is not necessarily constant. The dynamic misregistration variations cannot readily be fixed unless there is a tight control on the velocity. Registration is affected by several factors, including velocity variation which an operator may have little control over. If the velocity variation will affect registration by +1 or −1 pel, then the print stations should be set up relative to each other to affect a misregistration that is equal to or better than +1 or −1 pel. The fact that the system, method, and print pattern of the preferred embodiment is capable of calibrating and adjusting the registration within plus or minus a half pel or a quarter of a pel is considered to be very good. Because the total misregistration is due to several factors, narrowing one of the factors to a significantly smaller variation can make the variations caused by the other factors, that are less capable of being controlled, more tolerable.

Additionally, the misregistration of each print station can be measured for each of n successive pages (where n is typically two). The resulting misregistration of each print station is averaged for the successive pages. Thus, this average misregistration will further minimize the error due to velocity variation.

Operation of the Preferred Embodiment

The system, method, program, and print pattern of the invention is carried out for a given printer as follows. For each direction (vertical and horizontal) and for each color (e.g., cyan, magenta, and yellow), the following operations are carried out. First, the two repeating patterns are printed out several times. Each time, the amount of misregistration is varied by a known amount. The optical density of each pattern is measured with a densitometer. The optical density measured for the second pattern is subtracted from the optical density measured for the first pattern for each group of patterns, where each one of the groups has a different amount of misregistration from another group, to determine the density difference for each given amount of misregistration. The misregistration is equal to a constant times the density difference.

$$\text{misregistration} = C_1 * (\text{density difference})$$

The above data (specified known amounts of misregistration and density difference) are used to calculate the constant $C_1$. For the particular printer used in this preferred embodiment, the constant is approximately four, and more exactly 4/1.1. The constant will also be influenced by the characteristics of the specific densitometer that is being used for measuring the density and the inks/toners that are used in the printer.

A series of curves is made from the data points from actually varying the registration. The constant is determined from the measurements taken. Essentially, the machine is misregistered +1, +2, +3, +4 pels, and −1, −2, −3, −4 pels. Both of the patterns are printed at each of these values, and the density differences are determined to get a characteristic curve. This curve is then used to get the constant.

The constant could be different for each color. For example, cyan, yellow, and magenta might have a different constant. However, in working with the preferred embodiment, the colors all had essentially the same constant. However, there is no guarantee that this would be the case for different setups, printer, toner/inks, pattern dimensions, etc.

Once the constant is determined, the constant is used to determine misregistration as follows. Assume, for example, purposes that the constant has a value of 4. Then the first pattern and second pattern are printed by the printer using the current printer setup for registration. Then the first pattern is measured for its density, and the second pattern is measured for its density. The difference between the two readings is then calculated. Assume, for example, the density difference is one-half. The density difference is multiplied by the constant to arrive at the amount of misregistration. In this example, the misregistration is 2 pels, i.e., 0.5 * 4=2.

A computer program is used in the preferred embodiment of this invention to help the operator step through the registration process described above. The program may itself be resident in a printer, such as a high-function printer. Such a printer may also have its own internal densitometer such that the patterns are printed and optically measured internally within the printer. The program in the printer would then calculate the amount of misregistration, as discussed above, and automatically adjust itself to correct for the misregistration. This is a fully automated registration process.

Figure 8:
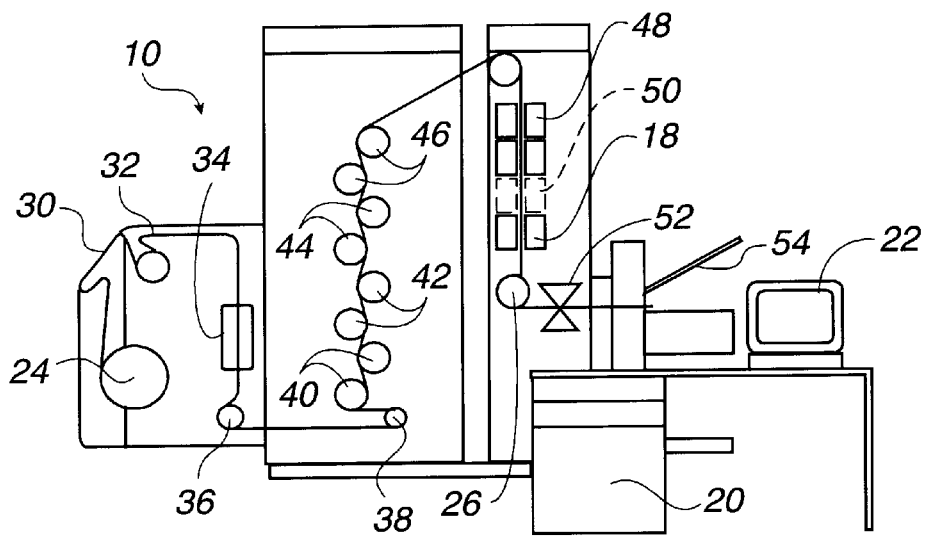
FIG. 8 is a block diagram of a printer.

FIG. 8 is a block diagram of a printer 10 having an internal densitometer 18. The printer shown also includes a paper reel 24, splicing table 30, paper drying roll 32, paper cooling 34, paper condition sensor 36, speed motor 38, printing stations 40, 42, 44, 46, fuser 48, paper cooling 50, torque motor 26, cutter 52, and stacker 54. The printing stations 40, 42, 44, 46 comprise front and back printing engines for the various colors of ink used by the printer, such as cyan, magenta, yellow, and black. For more colors of ink, additional pairs of print engines would be contained within the printing station. The display 22 displays information to the user, such as a determined misregistration amount. Input devices, such as touch screen, mouse, keyboard, etc. may also be connected to the printer to receive input from the user. The controller 20 contains the computer program, and the controller 20 can adjust the registration of the printing stations.

In a semiautomatic registration process, the densitometer and program may both be resident inside the printer, but the program will display to the user on a display screen attached to the printer the amount of adjustment that the printer needs. The operator would then make the adjustments manually on the printer. In another semiautomatic registration process, the densitometer may not be resident inside the printer, but may be external to the printer for use by the operator. The operator would then measure the optical densities and input the values into a computer program resident either in the printer or in a separate computer. The program would display to the user the amount of misregistration. The operator would then manually make the adjustment, such as through a control knob, button, panel, or instruct the printer to make the adjustment through an interface on the printer display panel.

It should be noted that the invention may also be carried out with the operator performing all of the calculations and manually adjusting the registration controls on the printer without the aid of any computer program.

For those embodiments using a computer program, the program receives as input the varying amounts of predetermined misregistration and the corresponding measured density values for the first pattern and the second pattern at each predetermined misregistration amount. The program then determines the density difference at each misregistration amount and the corresponding characteristic curve and the resulting constant for that set of input, i.e., for a color, direction of misregistration (horizontal or vertical), given printer, etc. Then, each time an operator desires to check the registration of the printer, the operator will have the printer print out the overall composite pattern, having a first and second repeating pattern, for each color and in each direction (horizontal and vertical). For each first and second repeating pattern printed, the density of each pattern is measured (either by a densitometer internal to the printer or by an operator using a densitometer) and these values (or the density difference values) are received as input by the computer program. The computer program will determine the misregistration using the constant that was determined from the initial calibration process.

The computer program will display to the operator the amount of misregistration, e.g., a 2-pel misregistration or a 2.2-pel nisregistration or whatever. For fully automatic embodiments, the program will then query the operator as to whether the operator wants the machine to correct itself automatically. If the operator inputs a "yes" indication, then the operator does not have to do anything else. For some results, the amount of misregistration may be so small (e.g., within a quarter pel or half pel) that it is not necessary to make any adjustments to the printer. The program contains an "if statement" to determine whether the misregistration is greater than a certain amount. If it is not, then no adjustments are made. If it is, then the adjustments are made, the two repeating patterns are reprinted using the new registration adjustment, the density difference is determined, and the constant is applied to determine a new misregistration amount, if any.

An aspect of the registration process is further described with reference to FIG. 7C. For example, assume that the actual misregistration was at +5 pels as shown at point 710. The density difference reading is indicated by the reading at point 712. The program would take this reading at point 712 and use the constant as calculated above to determine the misregistration to be +3 pels. The printer or operator would then make a +3 pel correction for misregistration. With this correction for a +3 pel misregistration, the "real" misregistration is now +2 pels. The registration process will then repeat itself, that is, both repeating patterns are printed and the densities are measured. Now, this density difference and the known constant are used to determine the amount of misregistration which will, in this case, be the "true" misregistration. After the printer is adjusted to account for this amount of misregistration, the patterns are printed again, and the densities are measured, the density difference should now be zero (or near zero to account for some error) to indicate that the registration of the printer is correct.

Therefore, anything within +8 or −8 pels will ultimately be corrected accurately by this iterative process. The number of iterations that it will take will vary. For example, a density difference may indicate that the misregistration is +1 (when in fact it is really out of registration by +7 pels). A correction for +1 pel will get readings indicating a misregistration of +2 pels (when in fact it is now out of registration by +6 pels). A correction for +2 pels will get readings indicating a misregistration of +4 pels (which should reflect the actual amount of misregistration). After making the adjustment for +4 pels, the next readings should indicate a density difference of zero.

If the misregistration is actually within +4 or −4 pels, only one iteration for correction should be necessary. If the misregistration is actually off by more than 4 pels (+4 or −4), but less than 8 pels (+8 or −8), then there may need to be two, three, or more iterations made before the misregistration is totally corrected.

As noted earlier, the curve of FIG. 7C continues on out in a repeating fashion beyond +8 and −8 pels. The program would need to be limited to only performing corrections within +8 or −8 pels. This limitation may be more than enough for some printers that may rarely, if ever, get out of registration by more than +8 or −8 pels. If a larger range was needed for a specific printer, the width of the pattern bars could be increased from 8 pels to 16 pels, as discussed previously. The characteristic curve would still be the same as shown in FIG. 7C, except that the +4 and −4 pel values would be +8 and −8 pels and the +8 and −8 pel values would be +16 and −16, respectively. Ideally, at least the majority of the misregistrations should fall into the middle half of this range so that the processing can take place entirely along the curve in FIG. 7C between points 721 and 720. As discussed above, increasing the width of the pattern bar to 16 pels, or other value, may introduce error depending upon the aperture size of the densitometer and the placement of the densitometer on the repetitive bar pattern. If a 16-pel-width bar pattern is needed to accommodate greater misregistrations, a densitometer with a larger aperture size could be used. In some situations, this may be difficult to implement if the operators already have a certain densitometer with a given aperture size that they use.

By limiting the program to correcting misregistrations within the range between 731 and 741 on the curve shown in FIG. 7C, then the above iterative process can be enhanced by adding some value checking within the program. For example, if the density difference indicated a misregistration of −1 pel, then after a correction for −1 pel, the next density difference should approach zero if indeed the misregistration was only off by −1 pel. However, if the actual misregistration was −7 pels, then the next density difference would have a greater negative value than the previous reading. The program could detect this and realize that the first reading must have been indicative of the area of the curve around −7 pels instead of −1 pel. The program would then adjust for that and indicate a misregistration of −7 pels. After adjustment for this amount of misregistration, the next density difference should indeed indicate a value of zero or close to it within an acceptable amount of error. Adding some checks into the program to analyze the direction the density difference is moving in response to misregistration adjustments can possibly eliminate some intermediate iterative steps.

Another feature of the program allows the operator to override the suggested misregistration correction. This allows the operator to manually make another adjustment or to tell the printer to make another misregistration adjustment if the operator suspects the actual misregistration is different from what the program initially indicates. This can also reduce the number of iterative steps needed to get the printer into registration.

It has been found that no error is created if the optical densities are not at the nominal value. If the optical density of the printer is out of the specification range, i.e., too high or too low, this does not affect the registration process described herein. In experimenting with the preferred embodiment of this invention, the optical densities were varied +20% and −20%, which are greatly out of the specification range. Even with this great amount of optical density variations, the constant $C_1$ had the same value. As such, registration can be corrected as described herein even if the optical densities are not correct. In previous registration techniques, optical density was not a concern since registration was determined by measuring line offsets by eye using an eye loop. Since the invention described herein measures registration by measuring density with a densitometer, optical density of the machine was an initial factor that had to be considered. However, the registration process described herein is insensitive to the optical density being printed by the printer, even though the registration process involves density measurements.

It should be noted that although the above preferred embodiment addressed misregistrations of various colors (e.g., cyan, magenta, and yellow) with respect to black, the invention can also be used to register two lines of the same color, e.g., black. For example, two laser beams can be lined up so that a first laser beam prints the first pel row and the second laser beam prints the second pel row. The invention disclosed herein, i.e., of using a densitometer to measure registration, can be used to get very tight registrations between the two.

Using the foregoing specification, the invention may be implemented as a machine, process, or one or more articles of manufacture (including the print pattern on a medium used by a printer and a computer program on a computer-usable medium) by using standard programming and/or engineering techniques to produce software, firmware, hardware, or any combination thereof Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts may involve the use of a memory or transmitting device which only embodies program code transitorily as a preliminary or final step in making, using, or selling the invention.

Memory devices include, but are not limited to, fixed (hard) disk drives, diskettes, optical disks, magnetic tape, semiconductor memories such as RAM, ROM, Proms, etc. Transmitting devices include, but are not limited to, the internet, intranets, electronic bulletin board and message/note exchanges, telephone/modem-based network communication, hard-wired/cabled communication network, cellular communication, radio wave communication, satellite communication, and other stationary or mobile network systems/communication links.

A machine embodying the invention may involve one or more printing systems and/or processing systems including, but not limited to, CPU, memory/storage devices, communication links, communication/transmitting devices, servers, I/O devices, or any subcomponents or individual parts of one or more printing systems and/or processing systems, including software, firmware, hardware, or any combination or subcombination thereof, which embody the invention as set forth in the claims.

One skilled in the art of computer science will easily be able to combine the software created as described with appropriate general purpose or special purpose computer hardware or printer hardware to create a computer/printer system and/or computer/printer subcomponents embodying the invention and to create a computer/printer system and/or computer/printer subcomponents for carrying out the method of the invention.

While the preferred embodiment of the present invention has been illustrated in detail, it should be apparent that modifications and adaptations to that embodiment may occur to one skilled in the art without departing from the spirit or scope of the present invention as set forth in the following claims. For example, some modifications and adaptations may include the following:

User input may be received from the keyboard, mouse, pen, voice, touch screen, or any other means by which a human can input data to a computer, including through other programs such as application programs;

any measuring device capable of measuring densities could be used;

any type of pattern, including varying shapes and dimensions, could be used that was capable of indicating misregistration in terms of its optical density;

pel sizes may vary depending on the specific printer being used;

actual width sizes will also vary depending upon the size of the actual printed dots of a printer;

although the color black was used herein as the reference color or the reference printing station, relative to which misregistration of the other colors or printing stations were determined, any color or printing station could be used as the reference color or reference printing station; and although the term "actual misregistration" may be used herein to indicate a present misregistration that is being determined, it may not be the "true" misregistration as further iterations may be needed depending upon where the measured density or density difference falls within the characteristic curve as described above.

We claim:

1. A method of determining misregistration of a printer, the method comprising:

printing multiple instances of a first and second repeated patterns, wherein for each printing instance, the first and second repeated patterns are printed at a different predetermined misregistration;

measuring densities of the first and second repeated patterns for each printing instance;

determining a density difference for each printing instance by subtracting the measured density of the first and second repeated patterns for the printing instance;

determining a characteristic curve providing a relationship of the determined density differences to the predetermined misregistrations;

calculating a correlation from the determined characteristic curve, wherein the correlation is between the density difference and predetermined misregistration;

printing at least one additional print pattern after calculating the correlation;

measuring density of the at least one additional print pattern;

determining an amount of misregistration by applying the correlation to the measured density of the at least one additional print pattern.

2. The method of claim 1, wherein applying the correlation to the measured density of the at least one additional print pattern comprises multiplying the correlation times the density of the measured at least one additional print pattern.

3. The method of claim 2, wherein the at least one additional print pattern comprises third and fourth print patterns, further comprising measuring a density difference of the third and fourth print patterns, wherein determining the amount of misregistration using multiplication is calculated as follows:

correlation * (measured density difference of the third and fourth print patterns).

4. The method of claim 1, wherein the first and second print patterns are printed by a first and second printing stations, wherein the at least one additional print pattern is printed by the second printing station, and wherein the determined misregistration indicates misregistration for the second printing station.

5. The method of claim 1, wherein printing the pattern comprises printing the pattern on successive pages and wherein measuring the density further comprises averaging the density over successive pages.

6. The method of claim 1, wherein the first print pattern, second print patter and at least one additional print pattern comprise a same pattern.

7. The method of claim 1, wherein the first print pattern and the second print pattern comprise a same print pattern.

8. The method of claim 1, wherein the first print pattern comprises a repeatedly printed first printed bar, wherein during each print repetition, the first printed bar is printed to have a first specified width of a first color from a first printing station, followed by a first space of a second specified width, and repeating the first printed bar and first space for at least a minimum distance; and wherein the second print pattern comprises a repeatedly printed second printed bar, wherein during each print repetition, the second printed bar is printed to have the first specified width of a second color from a second printing station, followed by a second specified width superimposed on the first printed bar and the first space but offset, by a predetermined amount in a predetermined direction, from the first printed bar and first space, and repeating the second printed bar and second space with the offset by the predetermined amount in the predetermined direction for the minimum distance;

whereby superimposing and offsetting the repeatedly printed second printed bar and the second space on top of the first printed bar and first space results in a repeated white space pattern having a resulting width, wherein the resulting width is repeated between every two instances of the second printed bar superimposed on the first printed par.

9. The method of claim 8, wherein the first and second specified widths are small enough so that at least one complete pattern sequence of the repeating print pattern is smaller than an aperture of a densitometer used to measure density of the repeating pattern.

10. A system for determining misregistration of a printer, the system comprising:

means for printing multiple instances of a first and second repeated patterns with the printer, wherein for each printing instance, the first and second repeated patterns are printed at a different predetermined misregistration;

means for measuring densities of first and second repeated patterns for each printing instance;

determining a density difference for each printing instance by subtracting the measured density of the first and second repeated patterns for the printing instance;

determining a characteristic curve providing a relationship of the determined density differences to the predetermined misregistrations;

means for calculating a correlation from the determined characteristic curve, wherein the correlation is between the density difference and predetermined misregistration;

means for printing at least one additional print pattern after calculating the correlation;

means for measuring density of the at least one additional print pattern; and means for applying the correlation to the measured density of the at least one additional print pattern to determine an amount of misregistration.

11. The printer of claim 10 wherein the means for applying the correlation to the measured density of the at least one additional print pattern to determine the amount of misregistration comprises multiplying the correlation times the measured density of the at least one additional print pattern.

12. The printer of claim 11 further comprising means for causing an adjustment of registration as a result of the determined amount of misregistration.

13. The printer of claim 11 further comprising means for displaying the amount of misregistration.

14. The printer of claim 11 further comprising means for querying an operator whether the printer should automatically correct for misregistration by the determined amount of misregistration.

15. The system of claim 11, wherein the at least one additional print pattern comprises third and fourth print patterns, further comprising measuring a density difference of the third and forth print patterns, wherein the means for determining the amount of misregistration using multiplication uses the equation:

correlation * (measured density difference of the third and fourth print patterns).

16. The system of claim 10 implemented in a printer, wherein the means for measuring the print patterns comprises a densitometer in the printer, and wherein the means for using the measured densities to determine the amount of misregistration is implemented in a computer program resident in the printer.

17. The system of claim 10, wherein the first pint pattern, second print pattern and at least one additional print pattern comprise a same pattern.

18. The system of claim 10, wherein the first print pattern and the second print pattern comprise a same print pattern.

19. The system of claim 10, wherein the first print pattern comprises
 a repeatedly printed first printed bar, wherein during each print repetition, the first printed bar is printed to have a first specified width of a first color from a first printing station, followed by a first space of a second specified width, and repeating the first printed bar and first space for at least a minimum distance; and
 wherein the second print pattern comprises a repeatedly printed second printed bar, wherein during each print repetition, the second printed bar is printed to have the first specified width of a second color from a second printing station, followed by a second specified width superimposed on the first printed bar and the first space but offset, by a predetermined amount in a predetermined direction, from the first printed bar and first space, and repeating the second printed bar and second space with the offset by the predetermined amount in the predetermined direction for the minimum distance;
 whereby superimposing and offsetting the repeatedly printed second printed bar and the second space on top of the first printed bar and first space results in a repeated white space pattern having a resulting width, wherein the resulting width is repeated between every two instances of the second printed bar superimposed on the first printed par.

20. A computer program, on a computer-usable medium, capable of causing a processor and printer to perform:
 printing multiple instances of a first and second repeated patterns, wherein for each printing instance, the first and second repeated patterns are printed at a different predetermined misregistration;
 measuring densities of the first and second repeated patterns for each printing instance;
 determining a density difference for each printing instance by subtracting the measured density of the first and second repeated patterns for the printing instance;
 determining a characteristic curve providing a relationship of the determined density differences to the predetermined misregistrations;
 calculating a correlation from the determined characteristic curve, wherein the correlation is between the density difference and predetermined misregistration;
 printing at least one additional print pattern after calculating the correlation;
 measuring density of the at least one additional print pattern; and
 determining an amount of misregistration by applying the correlation to the density of the at least one additional print pattern.

21. The program of claim 20, wherein applying the correlation to the measured density of the at least one additional print pattern comprises multiplying the correlation times the measured density of the at least one additional print pattern.

22. The computer program of claim 20, wherein the at least one additional print pattern comprises a third and fourth print patterns, further comprising measuring density difference of the third and fourth print patterns, wherein determining the amount of misregistration using multiplication is calculated as follows:

correlation * (measured density difference of the third and fourth print patterns).

23. The computer program of claim 20 wherein the computer program, on the computer-usable medium, resides in a printer.

24. The computer program of claim 20 wherein the computer program, on the computer-usable medium, resides in a computer external to the printer.

25. The computer program of claim 23, further comprising means for causing the printer to automatically adjust registration according to the determined amount of misregistration.

26. The computer program of claim 20 further comprising means for displaying the determined of misregistration.

27. The program of claim 20, wherein the first print pattern, second print pattern and at least one additional print pattern comprise a same pattern.

28. The program of claim 20, wherein the first print pattern and the second print pattern comprise a same print pattern.

29. The program of claim 20, wherein the first print pattern comprises
 a repeatedly printed first printed bar, wherein during each print repetition, the first printed bar is printed to have a first specified width of a first color from a first printing station, followed by a first space of a second specified width, and repeating the first printed bar and first space for at least a minimum distance; and
 wherein the second print pattern comprises a repeatedly printed second printed bar, wherein during each print repetition, the second printed bar is printed to have the first specified width of a second color from a second printing station, followed by a second specified width superimposed on the first printed bar and the first space but offset, by a predetermined amount in a predetermined direction, from the first printed bar and first space, and repeating the second printed bar and second space with the offset by the predetermined amount in the predetermined direction for the minimum distance;

whereby superimposing and offsetting the repeatedly printed second printed bar and the second space on top of the first printed bar and first space results in a repeated white space pattern having a resulting width, wherein the resulting width is repeated between every two instances of the second printed bar superimposed on the first printed par.

30. The program of claim 29, wherein the first and second specified widths are small enough so that at least one complete pattern sequence of the repeating print pattern is smaller than an aperture of a densitometer used to measure density of the repeating pattern.

* * * * *

UNITED STATES PATENT AND TRADEMARK OFFICE
CERTIFICATE OF CORRECTION

PATENT NO.   : 6,198,549 B1
DATED        : March 6, 2001
INVENTOR(S)  : William Chesley Decker It is certified that error appears in the above-identified patent and that said Letters Patent is hereby corrected as shown below:

Column 14,
Line 4, please delete "patter" and insert -- pattern -- therefore
Line 34, please delete "par" and insert -- bar -- therefore Column 15,
Line 59, please delete "par" and insert -- bar -- therefore Column 16,
Line 25, please insert -- a -- between "measuring" and "density"
Line 42, please insert -- amount -- between "determined" and "of"

Column 17,
Line 7, please delete "par" and insert -- bar -- therefore

Signed and Sealed this

Thirty-first Day of May, 2005

JON W. DUDAS
*Director of the United States Patent and Trademark Office*